Oct. 20, 1964    F. J. MARSEE ETAL    3,153,422
FLOAT CONTROLLED FUEL BOWL
Filed Nov. 2, 1962
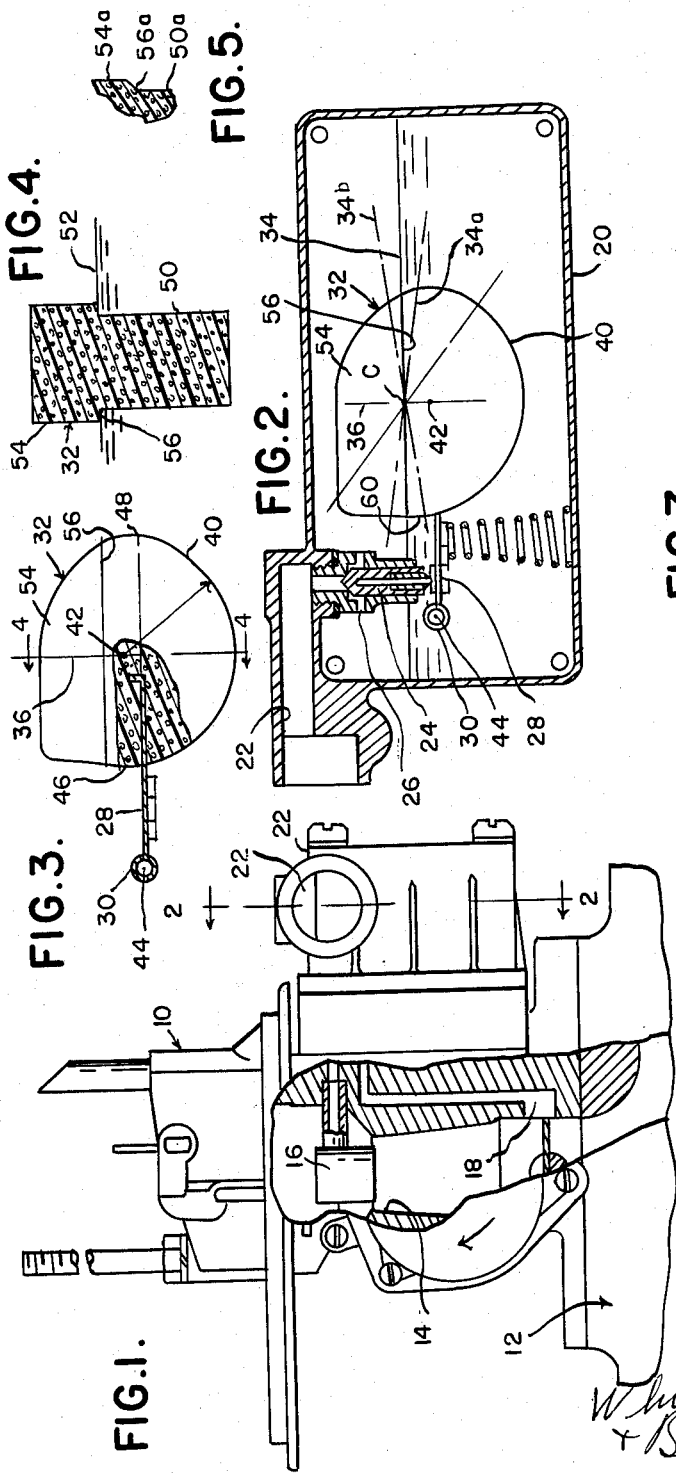
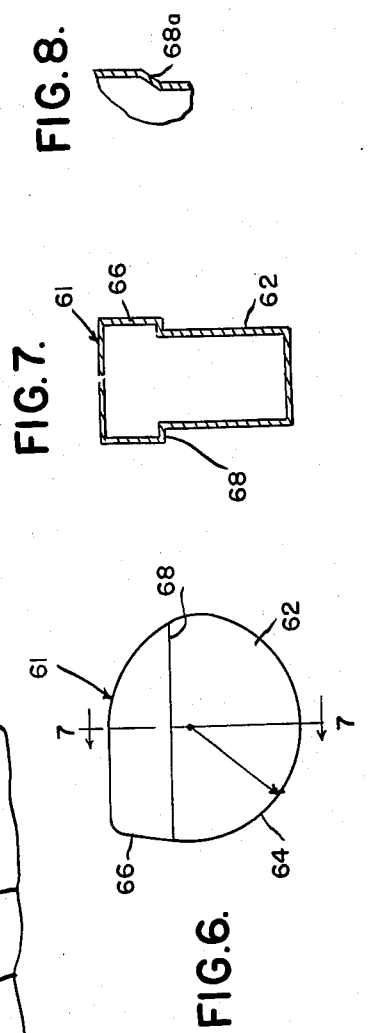
INVENTORS
FRED J. MARSEE
BY NEIL M. ROMEO
Whittemore, Hulbert
& Belknap ATTORNEYS ated Oct. 20, 1964

3,153,422
FLOAT CONTROLLED FUEL BOWL
Fred J. Marsee, Hazel Park, and Neil M. Romeo, St. Clair Shores, Mich., assignors to Holley Carburetor Company, Warren, Mich., a corporation of Michigan
Filed Nov. 2, 1962, Ser. No. 235,608
19 Claims. (Cl. 137—434)

The present invention relates to a float controlled fuel bowl, and more particularly to a float of novel construction and is a continuation-in-part application of our co-pending application U.S. 820,345, filed June 15, 1959, now abandoned.

It is an object of the present invention to provide a fuel bowl having therein a fuel inlet valve control float in which the center of buoyancy of the float, when submerged to valve controlling depth, is located approximately centrally of the fuel bowl.

It is a further object of the present invention to provide a fuel bowl having a fuel inlet valve, a lever pivoted within the bowl and connected to the valve, and a float connected to the lever adapted to maintain a substantially constant quantity of fuel in the bowl independent of the inclination of the upper surface of the fuel due to braking, acceleration, turning, or inclination of the vehicle.

More specifically, it is an object of the present invention to provide a fuel bowl and float combination as described above in which the lower portion of the float is approximately curved on a radius about an axis parallel to the pivot axis of the float and located substantially intermediate the inner and outer ends of the float, referenced to the pivot axis thereof.

It is a further object of the present invention to provide a fuel bowl and a float combination adapted to exert abruptly increased buoyant forces when the fuel level exceeds a predetermined level within the bowl.

More specifically, it is an object of the present invention to provide a fuel bowl float combination as described in the preceding paragraph in which the floating comprises a normally submerged lower portion, a laterally enlarged upper portion, the junction between the upper and lower portions being located approximately at the normal fuel level so that increase of fuel above the normal level submerges portions of the laterally enlarged upper portion.

It is a further object of the present invention to provide a float for controlling a valve which is composed of foamed solid material having a multiplicity of closed air cells therein.

Other objects and features of the invention will become apparent as the description proceeds, especially when taken in conjunction with the accompanying drawing, illustrating preferred embodiments of the invention, wherein:

FIGURE 1 is an elevational view with parts broken away, of a carburetor mounted on an intake manifold.

FIGURE 2 is a section through the fuel bowl along the line 2—2, FIGURE 1.

FIGURE 3 is an elevational view of a float constructed in accordance with the present invention.

FIGURE 4 is a sectional view on the line 4—4, FIGURE 3.

FIGURE 5 is a fragmentary elevational view similar to FIGURE 4, showing a modification of the float.

FIGURE 6 is an elevational view of a hollow float constructed in accordance with the present invention.

FIGURE 7 is a sectional view on the line 7—7, FIGURE 6.

FIGURE 8 is an enlarged fragmentary view showing a modification of the construction shown in FIGURE 7.

Fuel bowl valve controlling floats as at present constructed are incapable of eliminating excessive fuel level build-up within the fuel bowl when the vehicle is in a turn, or is undergoing periods of braking, acceleration, or inclination. Fuel spillage occurs as a result of the fuel level build-up and tends to cause engine stalling.

One of the reasons for the fuel level build-up is that the center of buoyancy of the float when submerged to a depth corresponding to a normal quantity of fuel in the bowl is substantially displaced laterally from the center of the bowl. Thus, as the fuel is shifted by acceleration, deceleration turning, or inclination of the vehicle, the float is no longer responsive to the actual quantity of fuel in the bowl.

In accordance with the present invention, the difficulties referred to are substantially eliminated by forming the effective center of buoyancy of the float so as to be closely adjacent to a vertical centerline located substantially midway between the ends of the bowl. In addition, the float is modified as to shape so that its lower portion is approximately curved on a radius about a centerline parallel to its pivot axis and located approximately intermediate of the float and midway between the ends of the float, reference to the pivot axis.

In addition, the float is modified so as to have a relatively smaller lower portion which is normally submerged, and a laterally enlarged upper portion, the junction between the relatively smaller lower portion and the laterally enlarged upper portion being located approximately at the normal fuel level so that an increase in fuel level above the normal level thereof results in abruptly increased buoyant forces effective to close the fuel inlet valve.

Referring now to the drawings, there is shown a carburetor 10 mounted on the inlet manifold 12 of an internal combustion engine, the carburetor 10 including a venturi throat 14 in which is located a main fuel nozzle 16. Fuel is supplied to the main fuel nozzle and to an auxiliary inlet port 18 by suitable passages from a fuel bowl designated at 20. The fuel bowl 20 is of generally rectangular shape, as best seen in FIGURE 2, and includes an inlet passage 22 adapted to be closed by an inlet needle valve 24. When the valve 24 is moved downwardly, fuel enters the bowl 20 through the laterally directed ports 26. It will be observed that when the needle valve 24 is closed, it is subjected on its upper end to the pressure of fuel supplied to the passage 22, this fuel supply normally being by a fuel pump, not shown.

The flow of fuel into the bowl 20 is controlled by the valve 24 which is biased in an upwardly closing direction by a lever 28 pivoted at one end at 30 within the bowl and having a float 32 connected to its outer movable end.

As best seen in FIGURE 2, wherein the valve is shown in a closed position, the normal fuel level is indicated at 34. Preferably, the center of buoyancy of the submerged portion of the float 32 is located at the vertical centerline 36 of the bowl 20. Accordingly, as the bowl 20 is inclined clockwise or counterclockwise, as seen in FIGURE 2, the buoyant force on the float 32 may be maintained approximately uniform.

Referring now more particularly to FIGURES 2 to 4, the float 32 is seen to have the downwardly convex rounded or approximately curved surface 40, the center of curvature of which is located approximately at 42. It will be observed that the axis of curvature 42 extends parallel to the pivot axis 44 of the lever arm 28 and is located approximately midway between the inner end 46 and the outer end 48 of the float 32, the inner and outer ends being designated with reference to the pivot axis 44.

In addition to the bottom convexly rounded shape so far described, the float 32 has a generally T-shaped cross-section as seen in FIGURE 4. More specifically, the float 32 includes a lower portion 50 which is normally submerged below the liquid level designated at 52, and a laterally enlarged upper portion 54. As seen in FIGURE 4, the junction between the lower portion 50 and the laterally enlarged upper portion 54 is constituted by a generally horizontal surface 56. The result of this construction is that when the liquid level rises above the normal liquid level line 52, and further upward movement of the float 32 is prevented by mechanical engagement of the valve 24 on its seat, a substantially larger volume of the float 32 is submerged and accordingly there is an abrupt increase in the buoyant force exerted by the float 32.

A second advantage of the configuration of the float 32 is in compensating for the effect of tilting of the bowl 20. In FIGURE 2 the normal fuel level when the bowl 20 is horizontal is indicated at 34, and at 34a and 34b there are indicated fuel levels resulting from tilting of the vehicle or movement of the fuel as a result of centrifugal forces.

Referring first to the fuel level as indicated by the line 34a, it will be observed that the portion of the float 32 between the lines 34 and 34a and extending to the right of center C of the float 32 has emerged from the liquid and hence the buoyancy of this portion of the float is lost. However, the portion of the float 32 between the lines 34a and 34 to the left of the center C is now submerged and thus represents increased buoyancy. However, the center of gravity of the newly submerged portion of the float 32 is much closer to the pivot axis 44 of the lever arm 28 than is the portion of the float 32 which is no longer submerged. This difference in lever arms of the newly submerged and exposed portions of the float 32 is compensated for at least in part by the relatively greater width of the portion of the float 32 above the shoulder 56 thereon, and by an appropriate dimensioning of the float 32, any desired degree of compensation may be achieved. Similarly, when the fuel bowl 20 is tilted so that the surface of the fuel therein occupies the dot and dash line 34b, the newly submerged portion of the float 32 to the right of the center C between the lines 34 and 34b is reduced due to the curvature or upward and inward inclination of the upper right hand corner of the float as seen in FIGURE 2. The surface of the float at the inner end 46 may be vertical or may incline inwardly and upwardly as shown in the drawing. Where it is inclined, the newly exposed portion of the float to the left of the center and between the lines 34 and 34b, while of lesser width, has an increased volume due to the inclination of portion 60 thereof.

In general, minimizing variations in torque due to inclination of fuel must result from recognition of the following factors:

Since the float is located generally centrally of the bowl, tilting of the fuel bowl or fuel level in one direction will expose a normally submerged portion of the float beyond the center of the float from the pivot axis of its lever and submerge a normally exposed portion of the float between its center and the pivot axis. If equal volumes of the float were thus exposed and submerged, a substantial decrease in torque would result due to the fact that the portion of the float located beyond its center from the pivot axis has a substantially greater torque arm than the other portion.

The tilting of the fuel bowl in the other direction will submerge a normally exposed portion of the float beyond the center of the float from the pivot axis of its lever and expose a normally submerged portion of the float between its center and the pivot axis. Assuming again that equal volumes of the float were thus exposed and submerged, a substantial increase in torque would result due to the fact that the portion of the float located between the center and the pivot axis has a substantially smaller torque arm than the other portion.

The variations in torque can be minimized by causing larger changes in the volume of the portion of the float between its center and the pivot axis which are subject to a change in condition of submergence than the corresponding volume located beyond the center line. This in turn can be accomplished by controlling the shape of either or both of the inner and outer end surfaces of the float and by controlling the variations in thickness of the float.

In addition, the relatively thick upper portion of the float as compared to its thin lower portion not only affects the shape of the end surfaces of the float, but also produces a useful function in itself. This is the function of providing an abrupt increase in buoyant force upon slight submergence of the float to a depth below its normal liquid level line, irrespective of whether the fuel bowl or fuel level is inclined from the horizontal.

Referring to FIGURE 5, there is illustrated a variation of the construction shown in FIGURE 4. In this figure the laterally enlarged upper portion is designated at 54a and the lower portion, which is normally submerged, is designated at 50a. The junction between the normally submerged portion 50a and the laterally enlarged upper portion 54a is in this case constituted by a surface 56a which is inclined from the horizontal. By selecting the inclination of the surface 56a, the abruptness with which the buoyant force is increased by a rise in liquid level may be controlled as desired.

As best illustrated in FIGURES 3 and 4, another important feature of the present invention is illustrated. As shown in the sectioned portions of these figures, the float body is formed of a foamed solid material containing a multiplicity of closed or sealed air cells. The material of course is selected to be insoluble and otherwise unaffected by the particular fuel in which it floats. A form of synthetic rubber such as a butadiene copolymer is suitable for this purpose. Alternatively, the float may be formed of resin compounds which when cured are substantially chemically inert.

The float may be formed from a foamed or whipped liquid uncured rubber or resin compound which may then be cast into the desired shape. Obviously, the buoyancy of the foamed solid float body may be predetermined by the amount of air whipped into the foam or by the number and size of the bubbles. By casting the whipped liquid rubber or resin, its exterior surface may be provided with a continuous smooth uninterrupted skin.

By using a foamed body of solid material, it is possible to provide the requisite buoyancy for controlling different size inlet valves in fuel bowls of identical configuration without at the same time providing excess buoyancy in cases where an inlet valve of relatively small area is provided.

Where the float body having the configuration illustrated and described herein is formed of a foamed solid material, it is preferably cast to include the movable end of the valve actuating lever 28 as best illustrated in FIGURE 3.

Referring now to FIGURES 6–8, there is illustrated a float 61 having the same configuration as the float 32 illustrated in the previously described figures. Specifically, the float 61 includes a lower portion 62 having the downwardly convex curved surface 64, the lower portion 62 being relatively narrow as compared to the laterally enlarged upper portion 66. In the construction shown in FIGURES 6–8, the principal difference is that the float 61 is a hollow body formed of a sheet material such for example as sheet metal. As in the foamed type float, the junction between the laterally enlarged upper portion 66 and the relatively narrow normally submerged lower portion 62 may be the generally horizontal wall 68 as shown in FIGURE 7, or it may be an inclined wall portion 68a to provide for a selection of the abruptness of increase in buoyancy upon a rise in liquid level.

The drawing and the foregoing specification constitute a description of the improved float controlled fuel bowl in such full, clear, concise and exact terms as to enable any person skilled in the art to practice the invention, the scope of which is indicated by the appended claims.

What we claim as our invention is:

1. A valve-controlling float attached to a control lever having a pivot axis, said float having opposite ends, the lever extending laterally outwardly from one of said ends, said float also including an upper portion and a lower portion which is of substantially less width than the upper portion, the junction between the lower and upper portions of said float forming a transverse wall, the other end of said float remote from the pivot axis of the lever having the end surface of the upper portion inclined upwardly and toward the pivot axis of the lever, said lower portion being curved on a radius measured about an axis parallel to the pivot axis of the lever and located approximately midway between the ends of the float, referenced to the pivot axis of the lever, the buoyancy of said float when floating substantially freely in a liquid having substantially the specific gravity of gasoline being such that the float is submerged up to said transverse wall.

2. A valve-controlling float attached to a control lever having a pivot axis, said float having opposite ends, the lever extending laterally outwardly from one of said ends, said float also including an upper portion and a lower portion which is of less width than the upper portion, the junction between the lower and upper portions of said float forming a transverse wall, and the ends of said float having the end surfaces of the upper portion respectively adjacent to and remote from the pivot axis of the lever converging upwardly, the buoyancy of said float when floating substantially freely in a liquid having substantially the specific gravity of gasoline being such that the float is submerged up to said transverse wall.

3. A float as defined in claim 2 in which said wall is substantially horizontal.

4. A float defined in claim 2 in which said wall is laterally inclined with respect to a horizontal plane.

5. A float as defined in claim 2 in which the sides thereof are flat and substantially perpendicular to the pivot axis of the lever.

6. A float as defined in claim 2 in which the float is hollow and formed of sheet material.

7. A float as defined in claim 2 in which the float is solid and formed of a foamed solid material having a multiplicity of closed cells therein.

8. A float as defined in claim 7 which has a smooth unbroken liquid impervious outer surface.

9. A float as defined in claim 2 in which said one end of the float adjacent the pivot axis of the lever is inclined upwardly and inwardly away from the pivot axis of the lever.

10. A float as defined in claim 2 in which said one end of the float adjacent to the pivot axis of the lever is substantially perpendicular to said transverse wall.

11. A valve-controlling float attached to a control lever having a pivot axis, said float having opposite ends, the lever extending laterally outwardly from one of said ends, said float also including an upper portion and a lower portion which is of less width than the upper portion, the junction between the lower and upper portions of said float forming a transverse wall, and the other end of said float remote from the pivot axis of the lever having the end surface of the upper portion inclined upwardly and inwardly toward the pivot axis of the lever, the buoyancy of said float when floating substantially freely in a liquid having substantially the specific gravity of gasoline being such that the float is submerged up to said transverse wall.

12. A valve controlling float attached to a control lever having a pivot axis, said float having opposite ends, the lever extending laterally outwardly from one of said ends, said float also including an upper portion and a lower portion which is of less width than the upper portion, the junction between the lower and upper portions of said float forming a transverse wall, the other end of said float remote from the pivot axis of the lever having the end surface of the upper portion inclined upwardly and inwardly toward the pivot axis of the lever, and said one end of said float adjacent the pivot axis of the lever having the end surface of said upper portion substantially vertical, the buoyancy of said float when floating substantially freely in a liquid having substantially the specific gravity of gasoline being such that the float is submerged up to said transverse wall.

13. A float as defined in claim 12 wherein said first-mentioned end surface of said other end is curved and said second-mentioned end surface of said one end is inclined upwardly and inwardly away from the pivot axis of the lever.

14. A normal level fuel supply device comprising a fuel bowl having a vertical center line and a fuel inlet valve element movable between closed and open positions, a lever pivotally mounted within said bowl and operatively connected to said valve element, a float connected to said lever in position to urge said lever in valve closing direction in response to the buoyant force of fuel in said fuel bowl, closure of said valve element being effective to limit further movement of said lever in valve closing direction, said fuel bowl having a normal fuel level determined by the position of said float in said bowl upon closure of said valve element by said float, said lever upon closure of said valve element orientating said float with respect to the normal fuel level in said bowl, said float comprising a normally exposed upper portion and a normally submerged lower portion which is of substantially less width than the normally exposed upper portion, said float having the path of the centers of buoyancy for various depths of submersion closely adjacent to the vertical centerline of said bowl, the junction between the lower and upper portions of said float forming a transverse wall which is located at the normal fuel level in the bowl when the float is at its upper limiting position to provide for abruptly increased buoyancy when the float is submerged above said wall, the ends of said float respectively adjacent to and remote from the pivot axis of said lever extending upwardly, the end surface of the upper portion of said float at the end remote from the pivot axis of said lever converging upwardly at a steeper inclination than the end surface of the upper portion at the end adjacent to the pivot axis to minimize the increase in torque due to submersion of a portion of the normally exposed upper portion of said float upon inclination of the top surface of fuel in said bowl.

15. The normal level fuel supply device defined in claim 14 wherein said first-mentioned end surface is curved and said second-mentioned end surface is inclined upwardly and inwardly away from the pivot axis of said lever.

16. The normal level fuel supply device defined in claim 14 wherein said transverse wall is substantially horizontal.

17. The normal level fuel supply device defined in claim 14 wherein said transverse wall is laterally inclined with respect to a horizontal plane.

18. The normal level fuel supply device defined in claim 14 wherein said lower portion is curved and a radius about an axis parallel to the pivot axis of said lever.

19. A normal level fuel supply device comprising a fuel bowl and a fuel inlet valve element movable between closed and open positions, a lever pivotally mounted within said bowl and operatively connected to said valve element, a float operatively connected to said lever in position to urge said lever in valve closing direction in response to the buoyant force of fuel in said fuel bowl, closure of said valve element being effective to limit further movement of said lever in valve closing direction, said fuel bowl having a normal fuel level determined by the position of said float in said bowl upon closure of said valve element by said float, said lever upon closure of said valve element orientating said float with respect to the normal fuel level in said bowl, said float comprising a normally exposed upper portion and a normally submerged lower portion which is of less width than the normally exposed upper portion, the junction between the lower and upper portions of said float forming a transverse wall which is located at the normal fuel level in the bowl when the float is at its upper limiting position to provide for abruptly increased buoyancy when the float is submerged above said wall, the ends of said float respectively adjacent to and remote from the pivot axis of said lever extending upwardly, the end surface of the upper portion of said float at the end remote from the pivot axis of said lever converging upwardly at a steeper inclination than the end surface of the upper portion at the end adjacent to the pivot axis to minimize the increase in torque due to submersion of a portion of the normally exposed upper portion of said float upon inclination of the top surface of fuel in said bowl.

References Cited in the file of this patent

UNITED STATES PATENTS

| | | |
|---|---|---|
| 895,817 | Twombly | Aug. 11, 1908 |
| 1,383,889 | Wendelken | July 5, 1921 |
| 2,064,156 | Firth | Dec. 15, 1936 |
| 2,404,594 | Ffleumer | July 23, 1946 |
| 2,660,194 | Hoffman | Nov. 24, 1953 |
| 2,678,074 | Adams | May 11, 1954 |
| 2,702,562 | Bimberg | Feb. 22, 1955 |
| 2,890,711 | Parker | June 16, 1959 |